United States Patent
Walker

(10) Patent No.: US 9,946,646 B2
(45) Date of Patent: Apr. 17, 2018

(54) SYSTEMS AND METHOD FOR DELAYED CACHE UTILIZATION

(71) Applicant: Advanced Micro Devices, Inc., Sunnyvale, CA (US)

(72) Inventor: William L. Walker, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 17 days.

(21) Appl. No.: 15/256,950

(22) Filed: Sep. 6, 2016

(65) Prior Publication Data

US 2018/0067856 A1    Mar. 8, 2018

(51) Int. Cl.
*G06F 12/08* (2016.01)
*G06F 12/0811* (2016.01)
*G06F 12/128* (2016.01)
*G06F 12/0831* (2016.01)

(52) U.S. Cl.
CPC ...... *G06F 12/0811* (2013.01); *G06F 12/0831* (2013.01); *G06F 12/128* (2013.01); *G06F 2212/283* (2013.01); *G06F 2212/69* (2013.01)

(58) Field of Classification Search
CPC .............. G06F 12/0811; G06F 12/128; G06F 12/0831; G06F 12/0888; G06F 2212/1028; G06F 2212/283; G06F 2212/69; G06F 1/3275
See application file for complete search history.

(56) References Cited

U.S. PATENT DOCUMENTS

| | | | | |
|---|---|---|---|---|
| 2008/0059707 | A1* | 3/2008 | Makineni | G06F 12/0897 711/122 |
| 2011/0093659 | A1 | 4/2011 | Jo et al. | |
| 2013/0111136 | A1 | 5/2013 | Bell, Jr. et al. | |
| 2013/0262780 | A1* | 10/2013 | Manne | G06F 12/0804 711/142 |
| 2013/0346683 | A1* | 12/2013 | Walker | G06F 12/0804 711/105 |

(Continued)

FOREIGN PATENT DOCUMENTS

KR    10-1999-0079976 A    11/1999

OTHER PUBLICATIONS

Mazen Kharbutli, et al., "Counter-Based Cache Replacement and Bypassing Algorithms", IEEE Transactions on computers, vol. 57. No. 4, Apr. 2008, 15 pages.

(Continued)

*Primary Examiner* — Hiep Nguyen

(57) ABSTRACT

A system for managing cache utilization includes a processor core, a lower-level cache, and a higher-level cache. In response to activating the higher-level cache, the system counts lower-level cache victims evicted from the lower-level cache. While a count of the lower-level cache victims is not greater than a threshold number, the system transfers each lower-level cache victim to a system memory without storing the lower-level cache victim to the higher-level cache. When the count of the lower-level cache victims is greater than the threshold number, the system writes each lower-level cache victim to the higher-level cache. In this manner, if the higher-level cache is deactivated before the threshold number of lower-level cache victims is reached, the higher-level cache is empty and thus may be deactivated without flushing.

28 Claims, 7 Drawing Sheets

(56) References Cited

U.S. PATENT DOCUMENTS

| | | | |
|---|---|---|---|
| 2014/0108734 A1* | 4/2014 | Kitchin | G06F 9/4418 |
| | | | 711/122 |
| 2014/0181411 A1* | 6/2014 | Thottethodi | G06F 12/0891 |
| | | | 711/133 |
| 2014/0181414 A1* | 6/2014 | Eckert | G06F 12/0808 |
| | | | 711/135 |
| 2015/0039833 A1* | 2/2015 | Chang | G06F 12/0848 |
| | | | 711/129 |
| 2015/0212947 A1* | 7/2015 | Henry | G06F 12/0893 |
| | | | 713/323 |
| 2016/0092373 A1 | 3/2016 | Doshi et al. | |
| 2017/0270045 A1* | 9/2017 | Kwon | G06F 12/0804 |

OTHER PUBLICATIONS

International Search Report and Written Opinion dated Dec. 17, 2017 for PCT/US2017/049921, 9 pages.

* cited by examiner

SYSTEMS AND METHOD FOR DELAYED CACHE UTILIZATION

BACKGROUND

Processing systems often utilize memory subsystems with multiple levels of caches. It often is advantageous to deactivate (that is, "power down") such caches when not in use. To deactivate a cache, the cache is flushed and any valid lines are sent to system memory. However, power is consumed while searching the higher-level cache for valid cache lines to send to memory. Some conventional memory subsystems utilize tracking hardware outside the cache to track a set of validity bits, sometimes referred to as "way valid" or "sector valid" bits, that indicate roughly occupied regions of the cache—that is, where valid cache lines are located within the cache, to help speed the search for the valid lines. The use of such validity bits can accelerate the flush if the valid lines are not spread widely over the cache. Nevertheless, the search for valid lines and the process of flushing a cache in preparation for deactivation of the cache utilizes a significant amount of power or a significant number of clock cycles.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
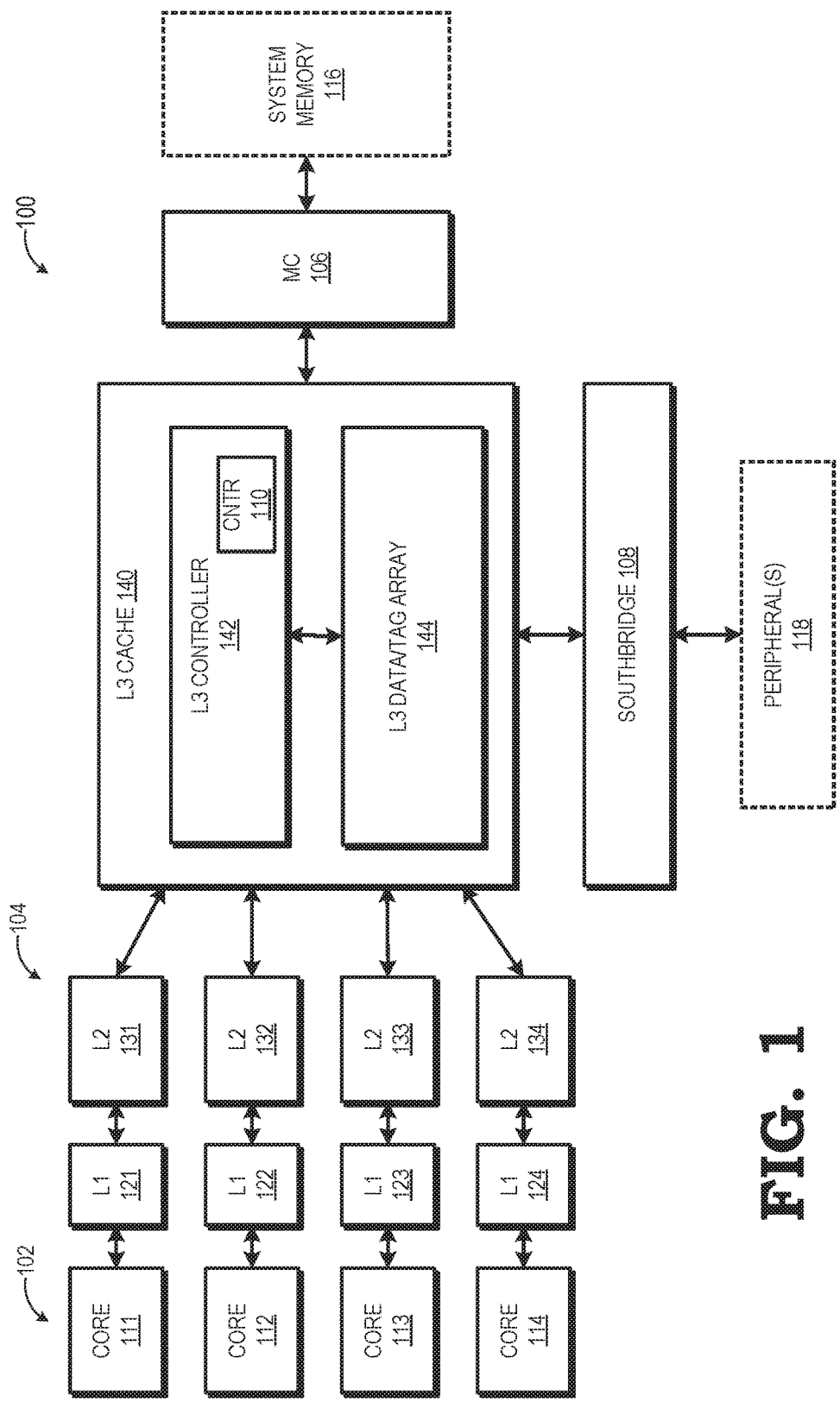
FIG. 1 includes an illustration of an example system for memory management utilizing a delayed caching technique in accordance with some embodiments.

FIGS. 1-8 illustrate example systems and methods for cache management utilizing a delayed caching process following activation of a cache so as to reduce the power and cycle costs incurred in flushing the cache when the cache is subsequently deactivated. In an example embodiment, a system includes one or more processor cores, and a memory subsystem comprising at least a lower-level cache and a higher-level cache, as well as a memory controller and a system memory. The higher-level cache is activated (that is, changed from a low-power state to a higher-power state) in response to activity at one or more associated processor cores. In response to activating the higher-level cache, the system counts cache lines transferred from the lower-level cache or removed from the lower-level cache. Such transferred or removed cache lines are referred to herein as "lower-level cache victims." While the count of lower-level cache victims does not exceed a specified threshold number, a lower-level cache victim is sent to system memory and, for example, not written to the higher-level cache. When the count reaches the threshold number, any subsequent lower-level cache victims are permitted to be stored in the higher-level cache. Thus, caching of the lower-level cache victims at the higher-level cache is delayed until the threshold number of lower-level cache victims is reached. As such, the higher-level cache remains empty longer after its activation and thus in the event that the higher-level cache is deactivated shortly after being activated, the higher-level cache is more easily transitioned to the deactivated state without the time and energy expense of searching for and transferring valid cache lines from the higher-level cache to system memory.

In an alternative embodiment, when the higher-level cache is activated, the system counts the lower-level cache victims issued following activation of the higher-level cache. While the count does not exceed a threshold number, the lower-level cache victims are stored in the higher-level cache and a list of cache line addresses or other locations in the higher-level cache that store the cache level victims (this list referred to herein as a "flush table") is stored at the system. Optionally, the memory controller further stores an indicator indicating whether the count exceeded the threshold. If the higher-level cache is deactivated and the count does not exceed the threshold, the system implements a deactivation procedure that accesses the flush table and flushes the cache lines of the higher-level cache associated with the specific cache line addresses stored in the flush table. Alternatively, when the count has exceeded the threshold number when the higher-level cache is deactivated, the memory is deactivated in accordance with a different deactivation procedure, such as a procedure based on the tracking valid bits, the identification of ways or other regions that were used to store cache victims or otherwise occupied by cache victims, flushing those identified ways of the higher-level cache utilized to store the lower-level cache victims, and deactivating the higher-level cache. Accordingly, after short time periods in a high-power state, valid cache lines can be more readily identified and transferred prior to transitioning to a low-power state, reducing time and power consumption associated with the transition between power states.

FIG. 1 illustrates a processing system 100 in accordance with at least some embodiments. In the depicted example, the processing system 100 includes a compute complex 102, a cache hierarchy 104, a memory controller 106, and a southbridge 108. The compute complex 102 includes a plurality of processor cores, such as the four processor cores 111, 112, 113, 114. The processor cores include, for example, central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104 and a system memory 116. Thus, data to be cached in the cache hierarchy 104 typically is manipulated as blocks of data referred to as cache lines, and which are addressed or otherwise located in a memory hierarchy using a physical address of system memory 116. Cache lines are accessed from the system memory 116 by the memory controller 106 in response to memory requests from the cache hierarchy 104. Likewise, when a cache line containing modified data is evicted from the cache hierarchy 104 and thus needs to be updated in the system memory 116, the memory controller 106 manages this write-back process. The southbridge 108 operates as the interface between the cache hierarchy 104, the memory controller 106, and one or more peripherals 118 of the processing system 100 (e.g., network interfaces, keyboards, mice, displays, and other input/output devices).

The cache hierarchy 104 includes two or more levels of caches. In the illustrated example, the cache hierarchy 104 includes three cache levels: level 1 (L1); level 2 (L2), and level 3 (L3). For L1, the core complex 102 implements small private caches for each processing core, which are depicted as L1 caches 121, 122, 123, 124, each associated with a corresponding one of processor cores 111-114. For L2, the core complex 102 implements larger private caches for each processor core, which are depicted as L2 caches 131, 132, 133, 134 corresponding to processor cores 111-114, respectively. Each of the L2 caches 131-134 is private to its corresponding processor core, but the cache hierarchy 104 operates to maintain coherency between the L2 caches 131-134. The L2 caches 131-134 include, for example, direct mapped caches or n-way set associative caches in some embodiments.

For the L3 caching level, the cache hierarchy 104 implements an L3 cache 140 that is shared by the processor cores of the compute complex 102, and thus shared by at least the L2 caches 131-134. The L3 cache 140 implements an L3 controller 142 and an L3 data array including a plurality of indexes and a plurality of corresponding ways, each way to store a corresponding cache line at the corresponding index, and an L3 tag array to store the tag information associated with each index/way. The L3 data array and L3 tag array are collectively illustrated, and referred to herein, as L3 data/tag array 144. For the purposes of the following, the L3 cache 140 is considered a higher-level cache, whereas the L1 caches 121-124 and L2 caches 131-134 are considered lower-level caches (relative to the L3 cache 140).

As described in greater detail below, when a higher-level cache, such as the L3 cache 140, is activated (that is, converted from a lower power state to a higher power state) in response to activity at one or more of the associated processor cores 111-114, a counter 110 initiates a count of cache lines evicted from one or more of the lower-level caches (that is, "lower-level cache victims") following activation of the L3 cache 140 is initiated. For example, the count includes a count of L2 cache victims or a count of L1 and L2 cache victims to be removed from L1 caches 121-124 or L2 caches 131-134. The counter 110 may be implemented in, for example, the L3 cache 140 (e.g., in the L3 controller 142, as depicted in FIG. 1) or in hardware external to the L3 cache 140 (e.g., in memory controller 106).

While the count of lower-level cache victims does not exceed a threshold number, in some embodiments the cache hierarchy 104 prevents any lower-level cache victims from being cached in the L3 cache 140, and thus each lower-level cache victim is instead transferred to system memory 116, for example, using the L3 controller 142. However, once the count of lower-level cache victims meets or exceeds this threshold number, the cache hierarchy 104 permits any subsequent lower-level cache victims to be cached in the L3 cache 140. Thus, under this approach, the L3 cache 140 remains "empty" (that is, without valid cache lines) for the first threshold number of lower-level cache victims issued from the lower-level caches. Thus if the L3 cache 140 is deactivated again before the threshold number of lower-level cache victims have been evicted from the lower-level caches, the L3 cache 140 can be deactivated without having to flush the L3 cache 140.

Figure 2:
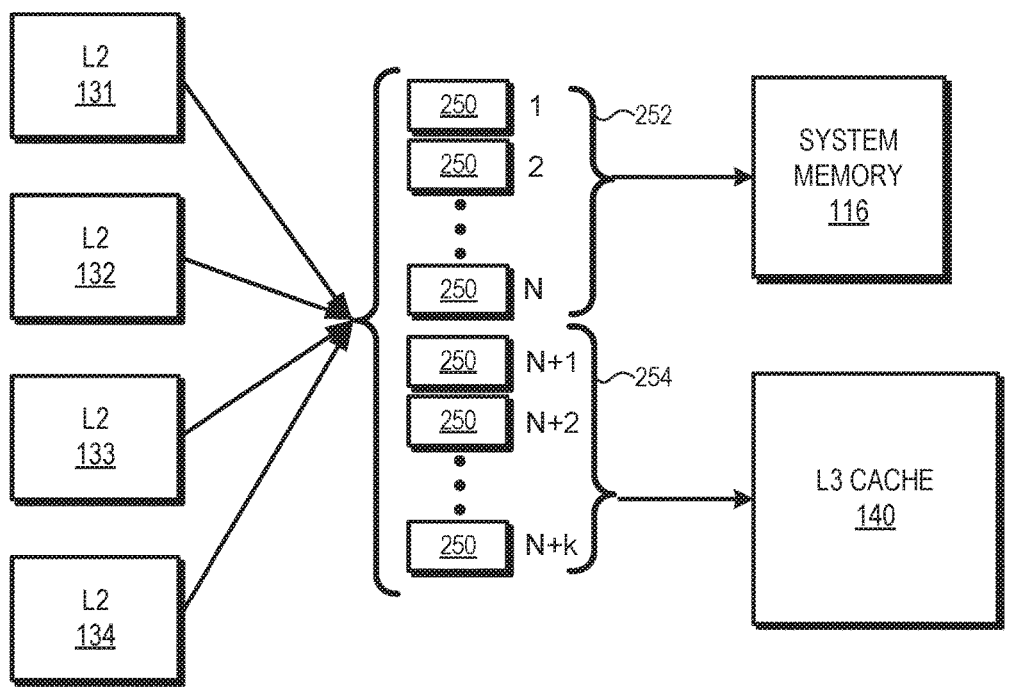
FIG. 2 includes an illustration of an example delayed caching process in the system of FIG. 1 in accordance with some embodiments.

To illustrate, referring now to a particular example illustrated in FIG. 2, lower-level cache victims 250 are evicted from the lower-level caches (e.g., L2 caches 131-134) following activation of the L3 cache 140. As illustrated, the L3 cache 140 is shared by a set of lower-level caches (e.g., L2 caches 131-134). Accordingly, in some instances this set of lower-level cache victims 250 is a cumulative set of lower-level cache victims from each of the lower-level caches associated with a shared higher-level cache. Alternatively, the set of lower-level cache victims 250 are generated by a single lower-level cache and provided to a dedicated higher-level cache. As depicted, the initial subset 252 of lower-level cache victims 250 numbering not greater than a threshold number "N" are sent to the system memory 116 without being cached in the L3 cache 140 following activation of the L3 cache 140, whereas any subsequent lower-level cache victims 250 after this threshold number N, such as those in illustrated subset 254, are permitted to be cached in the L3 cache 140.

In systems in which a higher-level cache (e.g., an L3 cache) is deactivated while associated processor cores are in a power-gated state and is activated when one or more of the associated processor cores are active, the higher-level cache can be deactivated more quickly when the cache is empty (that is, does not contain valid cache lines). In systems in which the processor cores and an associated higher-level cache wake up and shut down frequently, bypassing the higher-level cache during such short time periods of activity as described herein can both reduce power consumption and decrease the time associated with deactivating the higher-level cache. Thus, in the illustrated example of FIG. 2, if deactivation of the L3 cache 140 were to occur before N lower-level cache victims 250 were issued, the L3 cache 140 would be empty and thus ready to be deactivated without need to flush the L3 cache 140 of valid cache lines first, thereby reducing the power consumed when deactivating the L3 cache 140.

Figure 3:
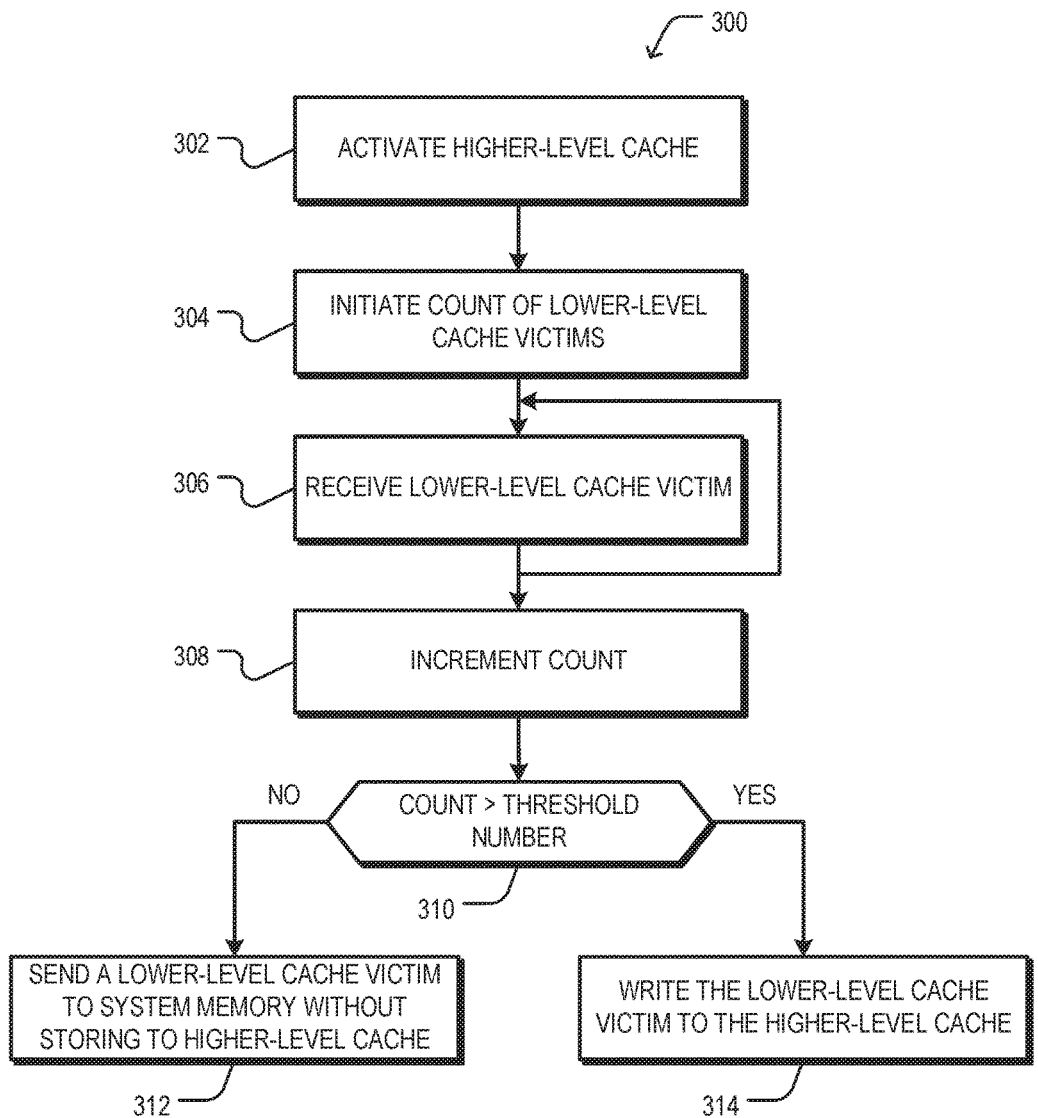
FIG. 3 includes a flow diagram illustrating an example method for managing cache utilization based on delayed caching following cache activation in accordance with some embodiments.

FIG. 3 illustrates a method 300 for implementing delayed caching following activation of a higher-level cache in accordance with some embodiments. The method 300 initiates with the activation of a higher-level cache (e.g., L3 cache 140, FIG. 1), as illustrated at block 302. In an example, the higher-level cache is activated in response to activity at associated processor cores or at an associated lower-level cache. In response to activating the higher-level cache, the counter 110 initiates a count of lower-level cache victims issued by the lower-level caches (e.g., the L2 caches 131-134), as illustrated at block 304.

As lower-level cache victims are transferred from the lower-level caches (as illustrated at block 306), the L3 controller 142 increments the current count by one (count=count+1) for each lower-level cache victim issued, as illustrated at block 308, and then compares the current count of the lower-level cache victims with a threshold number, as illustrated at block 310. If the current count does not exceed the threshold number, access to the higher-level cache is not permitted and thus the lower-level cache victim bypasses storage in the higher-level cache and is sent to system memory or caches other than the higher-level cache, as illustrated at block 312. However, when the current count associated with a lower-level cache victim exceeds the threshold number (that is, when at least N lower-level cache victims have been issued since activation of the higher-level cache), access to the higher-level cache is permitted, and thus the lower-level cache victim is stored to the higher-level cache, as illustrated at block 314. For example, the lower-level cache victim is written to the higher-level cache using conventional protocols, such as using way valid bits to identify valid cache lines.

Accordingly, by preventing storage of the first N (N=threshold number) lower-level victims to the higher-level cache following power up of the higher-level cache as shown by method 300, the higher-level cache remains empty over an initial period of time and for an initial number of lower-level cache victims. Thus, when deactivating the higher-level cache after short time periods of activity, the higher-level cache is more likely to be empty and thus avoiding flushing procedures prior to deactivating the higher-level cache.

Figure 4:
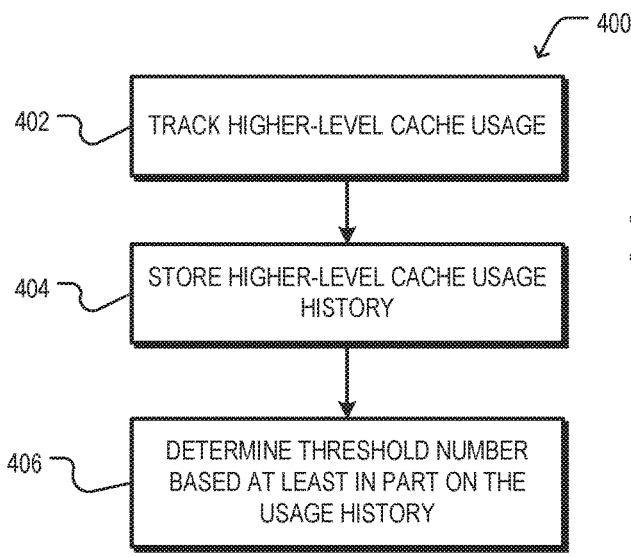
FIG. 4 includes a flow diagram illustrating an example method for training a threshold parameter used for a delayed caching process for memory management in accordance with some embodiments.

In some implementations, the threshold number is a static number over multiple activations of the higher-level cache. In some embodiments, this static number may be established based on an expected use of the system or determined through modeling or simulation. Alternatively, the threshold number is determined dynamically, for example, based at least in part on historical usage of the higher-level cache or the count of lower-level cache victims. For example, as illustrated in FIG. 4, a method 400 includes the L3 controller 142 tracking higher-level cache usage, as illustrated at block 402. Alternatively, the memory controller 106 tracks the higher-level cache usage and implements aspects of the method 400. In an example, the L3 controller 142 tracks a history of way valid bits to determine a usage history of the higher-level cache. In an example, a valid bit history associates valid bit usage with previous time periods of activity of the higher-level cache. In another example, the number or count of lower-level cache victims transferred during active periods is tracked. For example, a cache victim count history associates lower-level victim counts with previous time periods of activity.

As illustrated at block 404, the L3 controller 142 stores such higher-level cache victim history, such as a valid bit history or a victim count history, in a table or other data structure of the L3 controller 142 or the memory controller 106. As illustrated at block 406, the L3 controller 142 or the memory controller 106 determines the threshold number based at least in part on the cache victim history. For example, the threshold number is determined based at least in part on a count of lower-level cache victims transferred from lower-level cache during previous time periods of activity. In another example, a history of higher-level cache usage based on a number of way valid bits or sector valid bits is used to determine the threshold number. In a further example, the threshold number is further influenced by an upper constraint on the threshold number or a lower constraint on the threshold number. For example, when the threshold number is dynamically determined based on usage history, the L3 controller 142 prevents the threshold number from being set to a number higher than the upper constraint or prevents the threshold number from being set to a number lower than the lower constraint. In some embodiments, determining the threshold number further includes determining the threshold number based on an algorithm associating power consumption or a number of clock cycles to power down with higher-level cache usage history.

As such, the threshold number is determined using, for example, lookup tables, algorithms, heuristics or histograms relying on usage history data, such as a history of way valid or sector valid bits or a history of a count of lower-level cache victims associated with previous time periods of activity constrained by upper and lower constraints. Such lookup tables, algorithms, heuristics, or histograms are informed by, for example, power consumption or a number of power down clock cycles.

Figure 5:
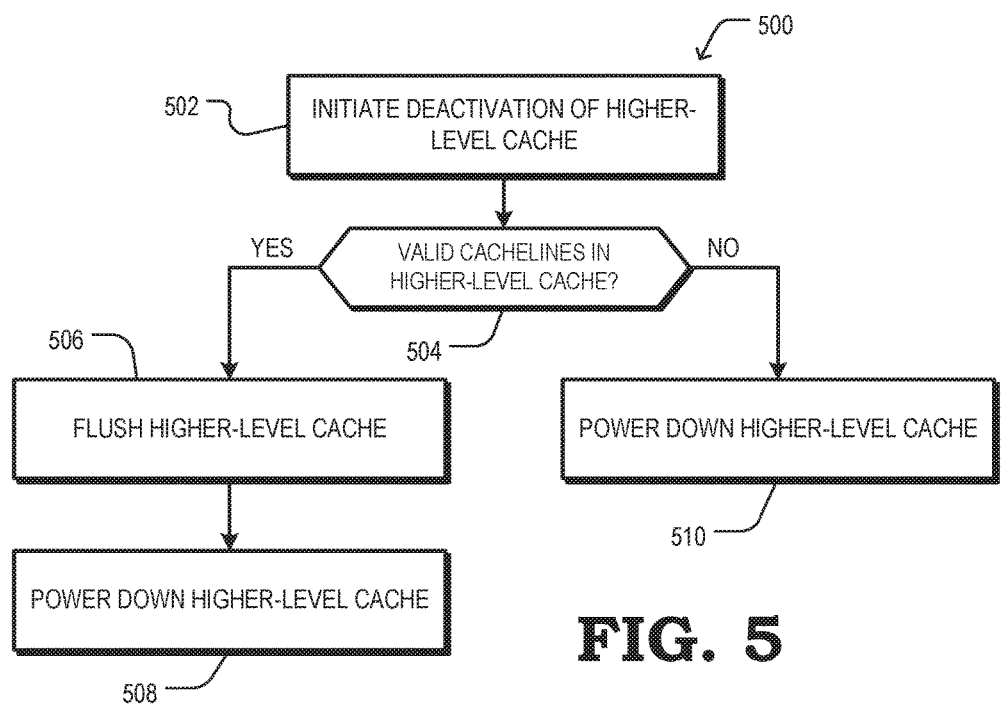
FIG. 5 includes a flow diagram illustrating an example method for flushing a cache subjected to delayed caching in accordance with some embodiments.
Figure 6:
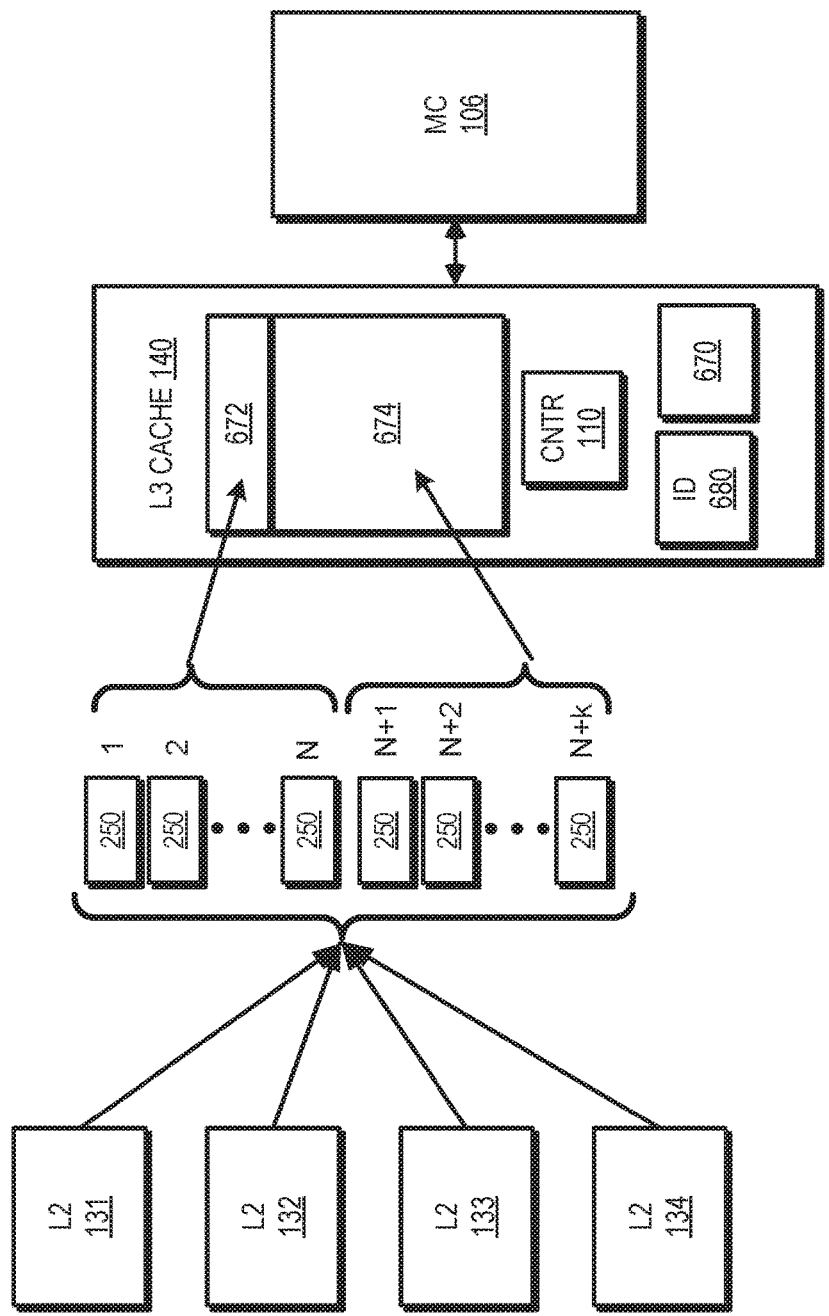
FIG. 6 includes an illustration of another example of a delayed caching process in the system of FIG. 1 in accordance with some embodiments.

To deactivate the higher-level cache, the system selects a particular deactivation procedure to implement depending on whether lower-level cache victims are written to the higher-level cache or selects a deactivation procedure for the higher-level cache based at least in part on whether the count of lower-level cache victims exceeds the threshold number. For example, as illustrated in FIG. 5, a method 500 includes initiating deactivation of a higher-level cache of the system 100, as illustrated at block 502. Such deactivation is, for example, initiated in response to associated cores entering power gated states.

The system 100 determines whether there are any valid cache lines contained in the higher-level cache, as illustrated at block 504. In the event that the higher-level cache contains valid cache lines, the system selects a deactivation protocol that utilizes a cache flush process, and thus the higher-level cache is flushed in accordance with this deactivation protocol, as illustrated at block 506. In an example, the system searches the tag array (e.g., L3 data/tag array 144) of the higher-level cache for way valid bits to identify cache lines of the higher-level cache to be flushed and can transfer the identified cache line victims to system memory 116. Once the higher-level cache is flushed, the system 100 places the higher-level cache in a low-power state, as illustrated at block 508.

Referring again to block 504, when no lower-level cache victims have been written to the higher-level cache, the system 100 can select a deactivation protocol that does not include a flushing process, and thus the system 100 can bypass a flush of the higher-level cache and instead power down the higher-level cache directly without flushing, as illustrated at block 510. As such, by preventing the first N lower-level victims from being stored to the higher-level cache, the system periodically can bypass a time intensive and power consuming flush procedure when deactivating in the event that the higher-level cache is deactivated before the N+1th lower-level victim is evicted from the lower-level cache(s).

The above description describes example implementations whereby a threshold number of initial lower-level victims following activation of a higher-level cache are prevented from being stored in that higher level cache. However, in an alternative implementation, illustrated by way of example in FIG. 6, an initial set of lower-level cache victims numbering not greater than a threshold number ("N") are permitted to be stored to a higher-level cache, such as the L3 cache 140. The L3 controller 142 or other component of the cache hierarchy 104 stores one or more flush tables 670 that store the location in the L3 cache 140 at which a corresponding lower-level cache victim of the initial set is stored. Further, as described below, in some implementations this initial set of lower-level cache victims is restricted to a subset of ways of the higher-level cache (this subset of ways represented in FIG. 6 by block 672), whereas lower-level cache victims issued following this initial set may be stored to any of the entire set of ways (represented by block 674), subject to other way-based restrictions. Further, the L3 controller 142 stores an identifier 680 (e.g., a control bit or a register value) to identify whether the threshold number was exceeded by a number of lower-level cache victims transferred to the higher-level cache. As explained in greater detail below, the flush table 670 can be utilized during deactivation procedures to reduce the amount of time, clock cycles, or power usage for deactivating the higher-level cache.

Figure 7:
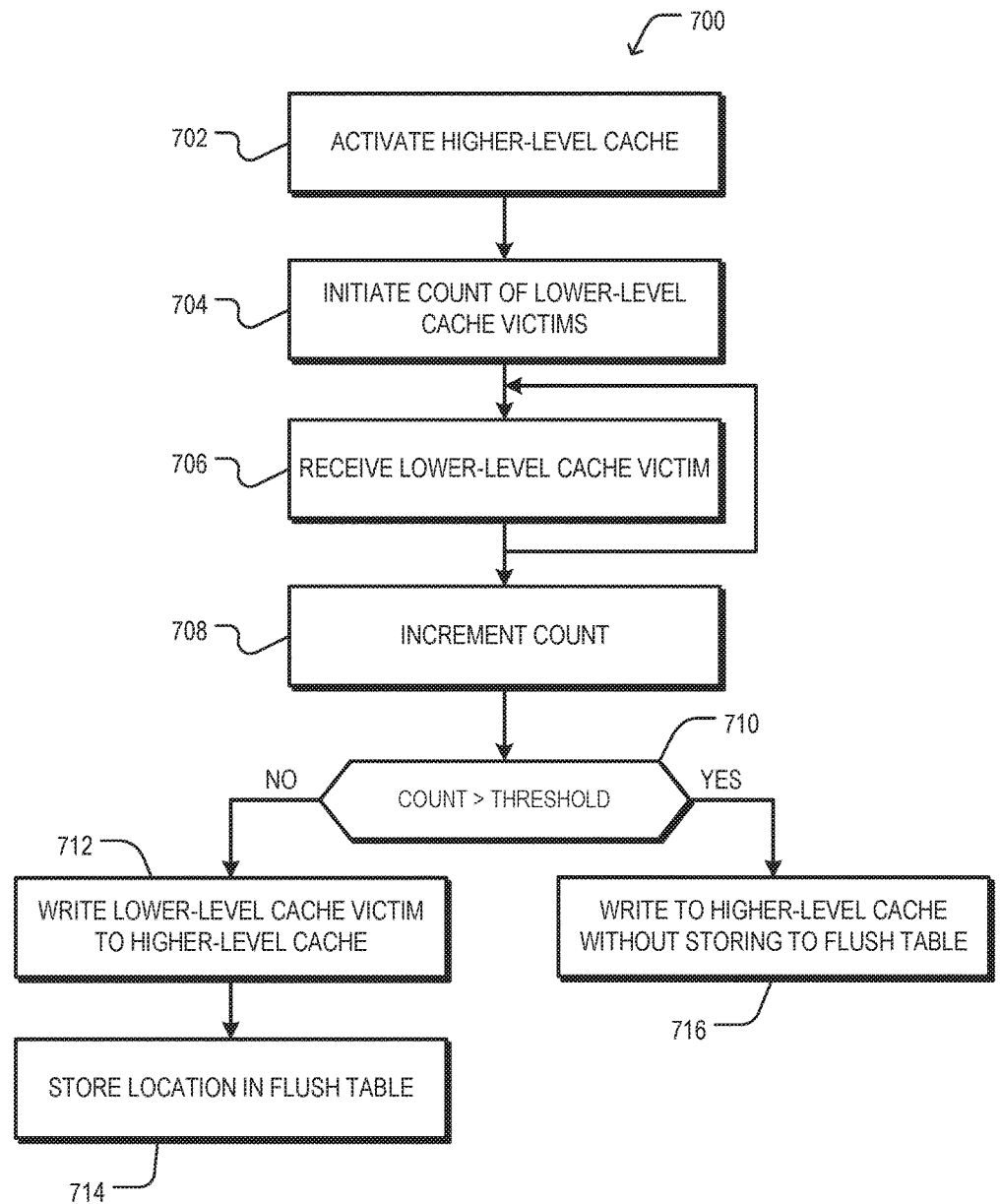
FIG. 7 includes a flow diagram illustrating an example method of memory management based on a delayed caching processing that utilizes a flush table in accordance with some embodiments.

FIG. 7 illustrates a method 700 for populating the flush table 670 following activation of a higher-level cache in accordance with some embodiments. The method 700 includes activating a higher-level cache (e.g., L3 cache 140), as illustrated at block 702. As noted above, the higher-level cache is activated, for example, in response to activity at one or more associated processor cores. As illustrated at block 704, the counter 110 initiates a count of lower-level cache victims evicted from lower-level cache(s). As lower-level cache victims are transferred from the lower-level caches (as illustrated at block 706), the memory controller 106 increments the current count by one (count=count+1) for each lower-level cache victim issued, as illustrated at block 708, and then compares the current count of the lower-level cache victims with a threshold number, as illustrated at block 710. While the count does not exceed the threshold number, each lower-level victim is written to the higher-level cache, as illustrated at block 712. Optionally, the lower-level cache victim is written to a location within the higher-level cache that is constrained by a way constraint that identifies a region to which a limited set of lower-level cache victims is written. The location within the higher-level cache to which the initial set of lower-level cache victims are written can also be stored in a flush table 670, as illustrated at 714. Alternatively, the initial set of lower-level cache victims can be written as a contiguous set written to a location stored in place of the flush table 670.

Referring again to block 710, when the count of lower-level cache victims exceeds the threshold number, the system 100 writes any subsequent lower-level cache victim to the higher-level cache without the location-based restriction employed for writing the initial set of N lower-level victims, as illustrated at block 716. Such lower-level cache victims can be written using various algorithms and heuristics to determine locations on the higher-level cache to which the lower-level cache victims are written. In each case, writing of the lower-level cache victim to a higher-level cache can identify used regions using way valid bits of the tag array for the higher-level cache.

In an alternative example, the aspects of the above methods can be implemented in the L3 controller 142. Further, the method 300 of FIG. 3 and the method 700 of FIG. 7 can be combined with a first threshold number of lower-level cache victims being sent to system memory without writing to higher-level cache and a second threshold number of lower-level cache victims being stored on the higher-level cache while storing the address in a flush table.

Figure 8:
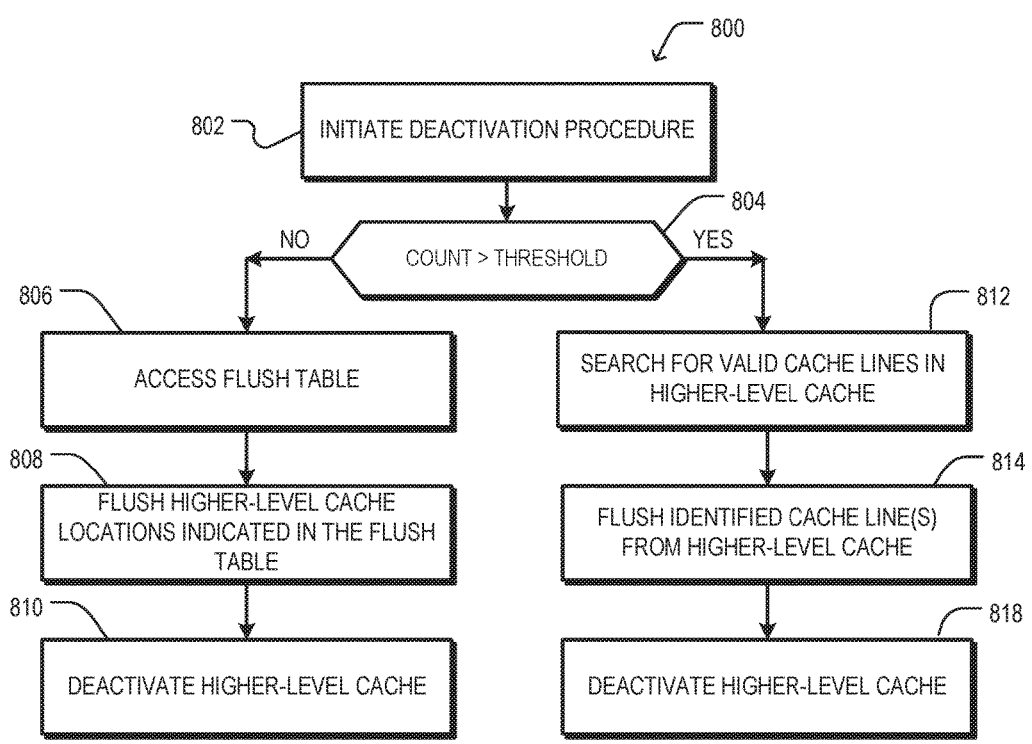
FIG. 8 includes a flow diagram illustrating an example method for flushing a cache using a flush table in accordance with some embodiments.

When deactivating the higher-level cache, the system 100 can determine, based on the count, whether to utilize the flush table 670 to accelerate flushing of the higher-level cache before deactivating, or to use other mechanisms, such as monitoring valid bits or tracking way valid bits. For example, as illustrated in FIG. 8, a method 800 includes initiating a power down procedure of the higher-level cache, as illustrated at block 802. A count of lower-level cache victims transferred from lower-level caches into the higher-level cache while the higher-level cache was active is compared to a threshold number, as illustrated at block 804. Note that this threshold number is the same as the threshold number employed at block 706 of FIG. 7.

If the count has not exceeded the threshold number (that is, if no greater than the threshold number of lower-level victims have been stored in the higher-level cache), the system 100 can flush the higher-level cache using the flush table 670. Thus, as illustrated at block 806, the system accesses the flush table 670 stored on a memory controller or other storage location. As described above with reference to FIG. 7, the flush table 670 stores an identifier for each location of each of the initial set of N lower-level victims within the higher-level cache. Utilizing the flush table 670, the system 100 can flush locations indicated in the flush table 670, as illustrated at 808, and then power down the higher-level cache, as illustrated at block 810.

Referring again to block 804, if the count of lower-level cache victims does exceed the threshold number, the system 100 is unable to flush the higher-level cache using only the flush table 670. Accordingly, the system 100 searches through the valid bits associated with each cache line in the tag array of the higher-level cache to identify valid cache lines or accesses way valid bits to identify regions within the higher-level cache that store valid cache lines to be flushed, as illustrated at block 812. The identified valid cache lines are flushed to system memory 116 (or a higher cache level), as illustrated at block 814, and the higher-level cache can be deactivated, as illustrated at block 818. Given that searching the higher-level cache for valid cache lines or valid regions of the higher-level cache to be flushed can take more time than utilizing a flush table 670 that identifies a limited number of physical locations on the higher-level cache, a deactivation procedure utilizing valid bits or table walking can be slower than procedures utilizing the flush table 670.

In some embodiments, the apparatus and techniques described above are implemented in a system comprising one or more integrated circuit (IC) devices (also referred to as integrated circuit packages or microchips), such as the processing system described above with reference to FIGS. 1-8. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A non-transitory computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for managing cache utilization in a processing system, the method comprising:
   in response to activating a higher-level cache, counting lower-level cache victims evicted from one or more lower-level caches;
   while a count of the lower-level cache victims is not greater than a threshold number, storing each lower-level cache victim of the lower-level cache victims to memory without storing the lower-level cache victim to the higher-level cache; and
   when the count of the lower-level cache victims is greater than the threshold number, storing each lower-level cache victim evicted after the threshold number was exceeded to the higher-level cache.

2. The method of claim 1, wherein each of the one or more lower-level caches is a level 2 (L2) cache, and wherein the higher-level cache is a level 3 (L3) cache.

3. The method of claim 1, wherein the threshold number is static over multiple activations of the higher-level cache.

4. The method of claim 1, further comprising:
   dynamically determining the threshold number based at least in part on at least one of: a cache victim count history of the one or more lower-level caches, a valid bit history of the higher-level cache, an upper constraint on the threshold number, a lower constraint on the threshold number, a power usage of the higher-level cache, or a power down time of the higher-level cache.

5. The method of claim 1, further comprising:
   storing a cache victim history associating a number of cache victims with each time period of a set of time periods of activity of the one or more lower-level caches; and
   determining the threshold number based at least in part on the cache victim history.

6. The method of claim 5, wherein determining the threshold number comprises determining the threshold number based at least in part on an upper constraint on the threshold number.

7. The method of claim 1, further comprising:
   tracking occupied regions of the higher-level cache using valid bits;
   storing a history of valid bits associating a usage of valid bits with time periods of activity of the higher-level cache; and
   determining the threshold number based at least in part on the history of valid bits.

8. The method of claim 1, wherein storing each lower-level cache victim evicted after the threshold number was exceeded to the higher-level cache comprises:
   selecting a region of the higher-level cache to which a lower-level cache victim is stored based on a way constraint.

9. The method of claim 1, further comprising:
   in response to an indication that the higher-level cache is to be deactivated, selecting a power down procedure for the higher-level cache based at least in part on whether the count of the lower-level cache victims exceeds the threshold number.

10. The method of claim 9, wherein:
    selecting a power down procedure comprises:
    selecting a power down procedure in which the higher-level cache is deactivated without flushing the higher-level cache when the count of the lower-level cache victims does not exceed the threshold number.

11. The method of claim 10, wherein:
    selecting a power down procedure comprises selecting a power down procedure in which the higher-level cache is deactivated with flushing of the higher-level cache when the count of the lower-level cache victims exceeds the threshold number.

12. A system comprising:
    a processor core;

one or more lower-level caches accessible by the processor core;
a higher-level cache accessible by the processor core and the one or more lower-level caches; and
a controller to access the one or more lower-level caches and the higher-level cache, wherein the controller is to:
in response to activating the higher-level cache, count lower-level cache victims evicted from the one or more lower-level caches;
while a count of the lower-level cache victims is not greater than a threshold number, store each lower-level cache victim of the lower-level cache victims to a system memory without storing the lower-level cache victim to the higher-level cache; and
when the count of the lower-level cache victims is greater than the threshold number, store each lower-level cache victim evicted after the threshold number was exceeded to the higher-level cache.

13. The system of claim 12, wherein the threshold number is static over multiple activations of the higher-level cache.

14. The system of claim 12, wherein the controller further is to dynamically determine the threshold number based at least in part on at least one of: a cache victim count history of the one or more lower-level caches, a valid bit history of the one or more lower level caches, an upper constraint on the threshold number, a lower constraint on the threshold number, a power usage of the higher-level cache, or a power down time of the higher-level cache.

15. The system of claim 12, wherein the controller is to:
store a cache victim history associating a number of cache victims with each time period of a set of time periods of activity of the one or more lower-level caches; and
determine the threshold number based at least in part on the cache victim history.

16. The system of claim 12, wherein the controller is to track occupied regions of the higher-level cache using valid bits in a tag array of the higher-level cache.

17. The system of claim 16, wherein the controller is to:
store a history of valid bits associating a usage of the valid bits with time periods of activity of the higher-level cache; and
determine the threshold number based at least in part on the history of valid bits.

18. The system of claim 12, wherein the controller is to power down the higher-level cache without flushing the higher-level cache when the count of the lower-level cache victims does not exceed the threshold number.

19. The system of claim 12, wherein the controller is to select a region of the higher-level cache to which a lower-level victim is stored while the count is not greater than the threshold number based on a way constraint.

20. A method for managing cache utilization, the method comprising:
storing a cache victim history associating a number of cache victims with each time period of a set of time periods of lower-level cache activity;
determining a threshold number of lower-level cache victims to be sent to memory without being stored to a higher-level cache; and
in response to activating the higher-level cache, storing up to a threshold number of lower-level cache victims following activating of the higher-level cache to system memory without writing to the higher-level cache.

21. The method of claim 20, wherein storing up to the threshold number of lower-level cache victims includes determining a count of the lower-level cache victims.

22. The method of claim 21, wherein storing up to the threshold number of lower-level cache victims further includes, storing each lower-level cache victim of the lower-level cache victims to memory without storing the lower-level cache victim to the higher-level cache while the count of the lower-level cache victims is not greater than the threshold number.

23. A method for managing cache utilization, the method comprising:
in response to activating a higher-level cache, counting lower-level cache victims sent to the higher-level cache; and
while a count of the lower-level cache victims is not greater than a threshold number, storing each lower-level cache victim of the lower-level cache victims to the higher-level cache and storing, in a flush table, a location of the higher-level cache at which the lower-level cache victim is stored.

24. The method of claim 23, further comprising:
when the count of the lower-level cache victims exceeds the threshold number, writing each lower-level cache victim to the higher-level cache without storing to the flush table a location of the higher-level cache at which the lower-level cache victim is stored.

25. The method of claim 23, further comprising:
storing a cache victim history associating a number of cache victims with each time period of a set of time periods of activity of the one or more lower-level caches; and
determining the threshold number based at least in part on the cache victim history.

26. The method of claim 23, further comprising:
deactivating the higher-level cache without flushing the higher-level cache when the count of the lower-level cache victims does not exceed the threshold number.

27. The method of claim 23, further comprising:
tracking occupied regions of the higher-level cache using valid bits;
storing a history of valid bits associating a usage of valid bits with time periods of activity of the higher-level cache; and
determining the threshold number based at least in part on the history of valid bits.

28. The method of claim 23, wherein storing each lower-level cache victim evicted after the threshold number was exceeded to the higher-level cache comprises:
selecting a region of the higher-level cache to which a lower-level cache victim is stored based on a way constraint.

* * * * *